United States Patent [19]
Jenkins

[11] Patent Number: 5,191,996
[45] Date of Patent: Mar. 9, 1993

[54] BREAD DISPENSING APPARATUS

[76] Inventor: George C. Jenkins, P.O. Box 1527, Statesboro, Ga. 30458

[21] Appl. No.: 809,168

[22] Filed: Dec. 18, 1991

[51] Int. Cl.$^5$ .................. B65G 59/00; B65D 83/00
[52] U.S. Cl. .................. 221/64; 426/115; 221/197; 221/279; 312/61; 312/71
[58] Field of Search .................. 221/64, 65, 197, 198, 221/226, 254, 279, 286; 220/93, 404, 406; 206/557, 804; 312/42, 61, 71; 383/906; 426/115

[56] References Cited

U.S. PATENT DOCUMENTS

| | | | |
|---|---|---|---|
| 1,418,153 | 5/1922 | Lorber | 221/279 |
| 2,110,615 | 3/1938 | Wilcox | 426/115 |
| 3,439,827 | 4/1969 | Marland | 220/404 |
| 3,741,434 | 6/1973 | Traverse | 220/404 |
| 4,266,668 | 5/1981 | Paek | 220/404 |
| 4,500,145 | 2/1985 | Fassauer | 312/61 |

Primary Examiner—H. Grant Skaggs
Attorney, Agent, or Firm—Laurence R. Brown

[57] ABSTRACT

Apparatus for storing and dispensing loaves of sliced bread in plastic wrappers in sanitary condition is simple, easy to operate and keeps the bread from drying out in storage. The bread is stored in a substantially closed tubular container with an opening for removing bread slices. A hinged lid closes to seal the opening to prevent entry of air into the bread wrapper in the storage condition, and opens to permit removal of the bread slice by slice in the dispensing condition. The open end of the wrapper is positioned outside the container on the outside of the tubing and is grasped and moved for forcing the loaf of bread slice by slice toward the opening for dispensing.

6 Claims, 2 Drawing Sheets 5,191,996

BREAD DISPENSING APPARATUS

TECHNICAL FIELD

This invention relates to apparatus for and methods of protective sanitary storage of loaves of bread and dispensing of bread slices from the stored loaves of sliced bread and more particularly it relates to means and methods for manual positioning of a stored loaf of sliced bread slice by slice for dispensing.

BACKGROUND ART

Storage dispensers for keeping sliced bread fresh and dispensing the bread slice by slice when desired are well known in the art. For example, Hilton, et al. 2,426,999 Sep. 9, 1947 stacks unwrapped slices and removes the bottom slice laterally with a sliding mechanism. However, the slices may become damaged by dragging them across the bottom of the pile, and the mechanisms contact the bread with a tendency to introduce pollutants or breed bacterial and they are hard to reach and difficult to sanitize. A similar dispenser, Ortiz U. Pat. No. 4,034,895, Jul. 12, 1977 feeds bread slices down an inclined chute and has an internal inaccessible separating mechanism which contacts the bread with the objective of avoiding compression of the slices, but the sanitation problems are not eliminated. Other such bread dispensers with internally hidden dispensing mechanisms that create a breeding ground for bacteria and can introduce external pollutants to contact the bread are also found in the following U.S. Pat. Nos.: Grigsby, et al. 4,905,869, Mar. 6, 1990; Honas 3,833,148, Sep. 3, 1974; Stanford 4,213,540, Jul. 22, 1980; Danow 3,578,207, May 11, 1971 and House 4,000,831, Jan. 4, 1977.

Furthermore in each of these prior art dispensers the bread slices are subject to distortion in storage and/or removal. Also they are constructed so that they permit entry and exit of air in such a manner that contributes to bread staleness by removing moisture.

Also these prior art devices require careful attention and special care in removing bread from wrappers to store it, and in dispensing bread, and cleaning or sanitizing the dispenser. As the bread is handled to store and load into the dispensers, thus taking time and trouble, it also provides the opportunity to introduce contaminants. Furthermore, this prior art provides systems for storing loaves of bread and dispensing bread slices more complex to use than the conventional retrieval of a wrapped loaf from a storage drawer, removing a closure fastener wire or clip, removing a slice, reclosing the wrapper and returning the loaf to it storage bin.

It is therefore one object of this invention to provide improved bread storage and dispensing apparatus and methods which reduce the chances for contamination.

Another object of this invention is to provide improved bread storage and dispensing apparatus and systems that are simpler and easier to use and maintain than prior art systems.

DISCLOSURE OF THE INVENTION

Thus in accordance with this invention a sanitary storage dispenser is provided which prevents bread from drying out in storage, is easy to load and is easy to use for dispensing bread slice by slice when needed. Furthermore, it requires no internal mechanisms that can introduce pollutants in contact with the bread or provide pockets or zones in which bacteria may breed or crumbs may accumulate, and thus is inherently sanitary in operation and can easily be cleaned and sanitized.

The dispenser comprises simply a tubing for receiving a loaf of sliced bread in upright posture of stacked slices with a pivoted top lid opening for retrieving slices off the top of the stacked bread slices. All internal dispensing mechanisms are eliminated and simpler use and initial storage of bread results by leaving the bread in its original plastic wrapper inside the storage tube without repackaging. Thus, many possible sources of contamination are eliminated. There is no accumulation of crumbs or bacteria breeding structure since the wrapper is removed when the bread is used up and thus it is simple and convenient to keep the dispenser sanitary.

The dispensing mechanism comprises the open end of the bread wrapper, which is wrapped over the upper rim of the storage tube and draped over the outer surface of the storage tube. By pulling downwardly on this wrapper the slices are raised over the top edge of the tube for manual removal. A pivoted lid latches in place to seal against the tube top and wrapping, thus keeping moisture in for long storage periods.

For facilitating the dispensing, a wrapper gripping collar is disposed over the tube top rim for vertical movement on the outside surface of the tubing. Thus, the lid is opened, the collar moved down, the slice is removed and the lid is closed in the simple mode of use made available by this invention.

Further objects, features and advantages of the invention will be found throughout the following text, the drawings and claims.

BRIEF DESCRIPTION OF THE DRAWINGS

In the drawings, wherein similar features have like reference characters in the various views to facilitate comparison.

THE PREFERRED EMBODIMENT

Figure 1:
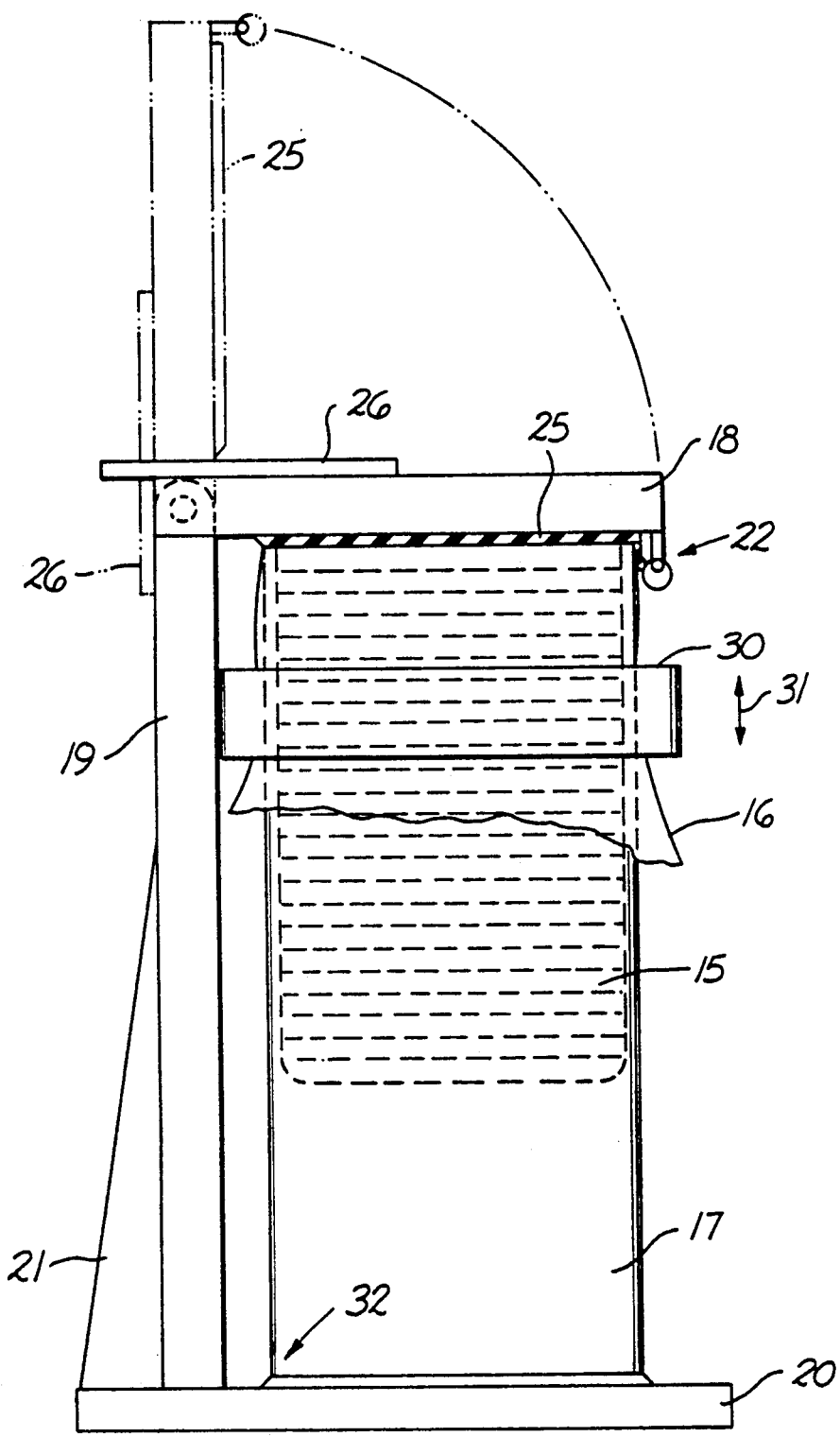
FIG. 1 is a side view sketch of a bread storage and dispensing embodiment of the invention.
Figure 2:
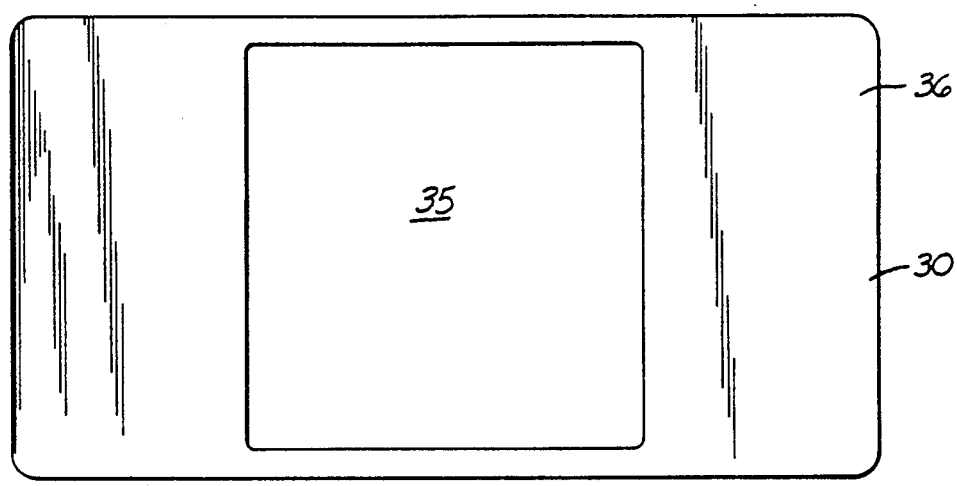
FIGS. 2 and 3 are respectively a plan and side view of a bread wrapper grasping collar embodiment of the invention for dispensing bread slice by slice.
Figure 3:
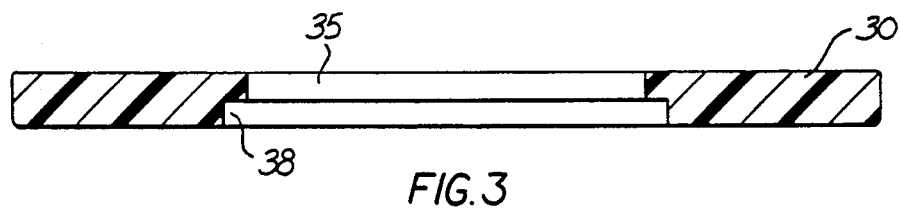
Figures 4, 5:
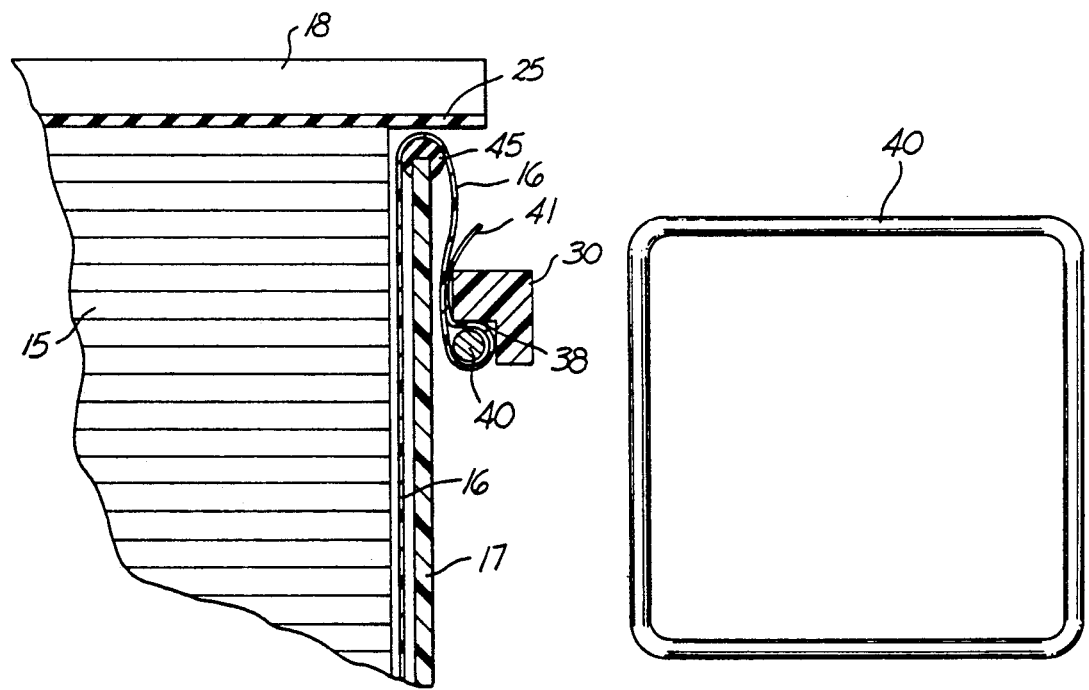
FIG. 4 is a plan view of a friction clamping ring for use in the collar to grasp a bread wrapper.
FIG. 5 is a fragmental view, partly in section showing the operation of a dispensing mechanism embodiment of this invention.

In FIG. 1 a bread dispensing and storage embodiment of the invention is shown in which a loaf of bread 15 contained in its plastic wrapper 16 is disposed within a substantially square tubing container 17. The pivotable lid 18, shown open in phantom view, is mounted on the post 19 alongside the storage compartment tubing 17 as affixed to base 20, strengthened by gussets 21. The friction catch latch mechanism 22 locks the lid in place in storage position with the elastic rubber sealing liner 25 affixed to the lid 18 engaging the top rim of the storage container tubing 17. The stop plate 26 limits to ninety degrees the arc of movement of the lid about a pivot axis 27, which is structured with enough built in friction to retain the lid open until manually closed and latched.

The collar 30 slides vertically as indicated by arrow 31 along the outer surface of the tubular member 17 to reside in place and retain the wrapper 16 neatly rolled over the top edge rim of the tubing 17. The breather hole 32 permits the loaf of bread 15 to freely enter and leave the tubular storage container 17 without binding and furthermore allows just enough air circulation inside the tubing 17 to avoid stagnation or accumulation of moisture which might breed bacteria or produce unsanitary conditions. The bread 15 cannot dry out in storage since it is sealed closed at the interface between the wrapper 16 and the rubber liner 25 about the rim of the tubing 19. The rubber liner is accessible for sanitation after each loaf of bread is used, and since only air enters the interior of the tubing 17 it needs little sanitation, but if desired it can be readily sanitized. The entire dispensing system contains no mechanisms or other structure that tends to accumulate bacteria and no crumbs or other residue can enter the tubing because of the function of the wrapper 16 as used by this invention.

This storage-dispenser apparatus is simpler to use for removal of a slice of bread than the conventional loaf 15 in wrapper 16 outside the container stored with a closure wire wrap or plastic clip about a gathered neck in the open end of the wrapper 16. In that case, the wire or clip must be removed and replaced, the wrapper 16 unfolded, a slice removed from within and the wrapper folded with the air substantially removed from the repackaged bread loaf. In contrast, with this invention, the lid 18 is simply swung open, the collar 30 moved down, a slice removed and the lid 18 snapped closed. Note that in this procedure, little air can enter the loaf of bread 15 or leave the loaf of bread to dry it out and make it stale. Contrast the usual method where in the removal of a slice from a tied wrapper 16, a lot of air enters the wrapper and permeates all the slices, whenever a slice is removed. Thus, the moisture is removed and the remaining bread quickly becomes stale. Not so here, where air only enters the facing of the next slice to be delivered before the lid 18 is closed to keep air out of the remaining slices. The pivot action of the lid 18 about pivot axis 26 is helpful in squeezing air off the top slice of bread as the lid 18 is closed and latched. Thus, this embodiment of the invention produces many advantages over the art in its functional operation of storage and dispensing.

The collar member 30 has two handle ends 35, 36 and a central aperture 35 that snugly and fits about the substantially square tubing 17 body. Preferably the collar 30 and tubular body 17 are of plastic, which has some elasticity so that the collar may hug the outer walls of the tubular body and can be held in place when lowered to deliver a slice of bread. Also the collar 30 has a lowermost groove 38 about the inner aperture 35 into which the clamp ring 40, plastic or metal, will frictionally snap and reside, thereby to entrap and grasp the open end 41 of the plastic bread wrapper 16, which may be folded over the clamping ring 40.

Note that the upper rim of the tubular container 17 may have a rubber grommet 45 for better sealing in storage condition when the lid 18 is latched down. Thus the wrapper 16 is held between the rubber sealing layer 25 on the lid 18 and the rubber grommet 45 on the rim of the tube 17 for assuring long storage life without drying out the remaining bread 15.

The loaf of sliced bread 15 is thus stored within a storage compartment 17 with an open mouth in its plastic wrapper 16 so that the slices are advanced one by one out of the mouth by pulling on the wrapper 16. This avoids any necessity for internal mechanisms for separating slices or for urging slices toward the mouth.

It is thus evident that this invention has advanced the state of the art and therefore those features of novelty defining the spirit and nature of the invention are set forth with particularity in the following claims.

I claim:

1. Storage and dispensing apparatus for loaves of sliced bread contained in original plastic wrapper bags, comprising in combination, a substantially closed sanitary storage compartment with a top opening rim for retaining a loaf of sliced bread held in said original plastic wrapper with the bread wrapper rolled over said compartment at said opening rim to extend down the outside of the compartment thereby to expose and move the top slice of bread upwardly out of the wrapper for removal, sealing rim structure about said opening rim, a lid for opening and closing said compartment by mating with said sealing rim and having mating sealing structure positioned to register with the sealing rim to retain the bread in storage in said compartment in a substantially air tight, sanitary atmosphere with said lid closed and adapted to permit bread slices to be removed from said opening with the lid open, and a collar functioning as dispensing means positioned external to said storage compartment for grasping a portion of the plastic wrapper extending down the outside and moving the wrapper downwardly on the outside surface of the compartment to force the loaf of bread inside the compartment upwardly toward the opening for moving the loaf of bread out of compartment slice by slice when the lid is open thereby for facilitating manual removal of bread slices and repositioning the loaf to a stable position with an unwrapped top slice adjacent said opening for closing the compartment without significant air between the lid and upper bread slice.

2. The apparatus of claim 1 wherein said compartment further comprises a rectangular hollow tube supported by a base at a bottom end to store the loaf of bread in an upright position with said opening at a top end.

3. The apparatus of claim 2 wherein said lid further comprises both a mounting post extending from the base to the top end of the tube and a panel member pivotable over a ninety degree arc on the mounting post for contacting and sealing the opening in closed position.

4. The apparatus of claim 1, wherein said dispensing means further comprises a snugly fitting collar frictionally engaging an outer surface of said storage compartment to hold said plastic wrapper in place while delivering a slice of bread.

5. Storage and dispensing apparatus for loaves of sliced bread contained in original plastic wrapper bags, comprising in combination, a substantially closed sanitary storage compartment with a top opening rim for retaining a loaf of sliced bread held in said original plastic wrapper with the bread wrapper rolled over said compartment at said opening rim to extend down the outside of the compartment thereby to expose and move the top slice of bread upwardly out of the wrapper for removal, a sealing rim about said opening, a lid for said opening rim with sealing structure positioned to mate about the sealing rim to retain the bread in storage in said compartment in a substantially air tight, sanitary atmosphere with said lid closed and adapted to permit bread slices to be removed from said opening with the lid open, and a collar functioning as dispensing means positioned external to said storage compartment for grasping an open end of the plastic wrapper extending out of said opening and moving the wrapper end downwardly on the outside surface of the compartment to force the loaf of bread inside the compartment upwardly toward the opening for moving the loaf of bread out of the compartment slice by slice when the lid is open thereby for removing bread slices and repositioning the loaf to a stable position with an unwrapped top slice adjacent said opening,
  wherein said compartment further comprises a rectangular hollow tube supported by a base at a bottom end to store the loaf of bread in an upright position with said opening at a top end,
  means for clamping the bread wrapper in said collar comprising a groove extending outwardly from the outside surface of the tube into a bottom portion of the collar and a clamping collar ring for frictionally and removable residing in place in said groove for holding the open end of the bread wrapper frictionally between the ring and the collar whereby downward movement of the yoke will pull on the wrapper and thereby force a slice of bread out of said opening.

6. A dispenser for a loaf of sliced bread packaged in a plastic wrapping having an open end, comprising in combination, a storage compartment with a dispensing opening for storing the loaf of bread with the open end of the plastic wrapping extending out of the dispensing opening with an unwrapped upper slice of bread exposed within the dispensing opening, a dispensing means movable downwardly outside the compartment having a mechanism for grasping the open end of the wrapping thereby to move the bread slice by slice toward the dispensing opening for manual removal as the dispensing means is moved downwardly and sealing cover means for closing the opening over the unwrapped upper slice with limited exposure to air thereby to sanitarily protect the stored bread and prolong its life.

* * * * *